(12) United States Patent
Chen et al.

(10) Patent No.: US 7,595,981 B2
(45) Date of Patent: Sep. 29, 2009

(54) NOTEBOOK COMPUTER AND MODULE OF ELECTRONIC DEVICE COMBINABLE WITH THE SAME

(75) Inventors: Wen-Hsiang Chen, Taipei (TW);
Chuan-Yu Hsu, Taipei (TW);
Ming-Wang Lin, Taipei (TW);
Wen-Hsing Chen, Taipei (TW);
Hung-Wen Hsu, Taipei (TW);
Lin-Hsiang Hsieh, Taipei (TW); Wei-Te Huang, Taipei (TW)

(73) Assignee: First International Computer Inc., Taipei (TW)

( * ) Notice: Subject to any disclaimer, the term of this patent is extended or adjusted under 35 U.S.C. 154(b) by 0 days.

(21) Appl. No.: 12/153,466

(22) Filed: May 20, 2008

(65) Prior Publication Data
US 2009/0021903 A1 Jan. 22, 2009

(30) Foreign Application Priority Data
Jul. 18, 2007 (TW) .............................. 96126264 A

(51) Int. Cl.
*G06F 1/16* (2006.01)
(52) U.S. Cl. .................. 361/679.44; 348/571; 568/698; 455/518; 386/125
(58) Field of Classification Search ................. 348/571, 348/731, 706, 553; 361/679.01, 679.44, 361/679.23, 679.43, 679.32, 679.55; 568/671, 568/698; 715/700; 386/1, 96, 46, 125; 455/556.1, 455/518, 422, 3.06; 716/6, 10, 12
See application file for complete search history.

(56) References Cited

U.S. PATENT DOCUMENTS

| 2005/0162821 A1* | 7/2005 | Homer et al. ............... 361/683 |
| 2006/0050060 A1* | 3/2006 | Chang ........................ 345/173 |
| 2007/0129101 A1* | 6/2007 | Wang et al. .............. 455/550.1 |

* cited by examiner

*Primary Examiner*—Hung V Duong
(74) *Attorney, Agent, or Firm*—Bacon & Thomas, PLLC

(57) ABSTRACT

A notebook computer includes a housing, a CPU, a memory, a display, a storage device, a detachable battery pack and a keyboard module. The notebook computer is characterized in that the housing includes a predefined space and a connection interface disposed in the predefined space. The connection interface is electrically connected to the CPU. The notebook computer includes a plurality of electronic device modules. Each electronic device module includes a casing portion and a main body portion, and the main body portion includes a transmission interface. The size of each electronic device module may correspond to the size of the predefined space. Each electronic device module may be secured in the predefined space for combination with the housing, and the transmission interface is electrically connected to the connection interface for power or data transmission. The plurality of electronic device modules are capable of combining individually with the housing for replacing different functions.

20 Claims, 11 Drawing Sheets

NOTEBOOK COMPUTER AND MODULE OF ELECTRONIC DEVICE COMBINABLE WITH THE SAME

BACKGROUND OF THE INVENTION

1. Field of the Invention

The present invention relates to a notebook computer and an electronic device module capable of being combined with the notebook computer and, more particularly, to a notebook computer capable of being combined with various electronic device modules.

2. Description of the Related Art

Notebook computers have become almost required electronic devices for modern living. Since notebook computers are very easy to travel with, everyone can enjoy their convenience. However, in order to add other functions to the notebook computer, other devices need to be connected to the notebook computer, such as a VOIP or a web camera, etc. When the user requires several extra functions, it becomes difficult to manage and travel carrying all the different devices. Also, all the cords required for the respective connections create a very disorganized appearance.

Furthermore, with developments in the technology, notebook computers are becoming thinner and lighter. Typical notebook computers usually have sizes equal to a document folder, however, even that size can sometimes be inconvenient. Moreover, typical notebook computers have their batteries attached to the bottom of the notebook computer, which can be inconvenient to change or remove.

Therefore, it is desirable to provide a notebook computer and electronic device modules that are combinable to mitigate and/or obviate the aforementioned problems.

SUMMARY OF THE INVENTION

A main objective of the present invention is to provide a notebook computer capable of being combined with various electronic device modules.

Another objective of the present invention is to provide an electronic device module capable of being combined with a notebook computer.

In order to achieve the above mentioned objective, the notebook computer of the present invention comprises a housing, a CPU, a memory, a display, a storage device, a detachable battery pack and a keyboard module. The notebook computer is characterized in that the housing includes a predefined space and a connection interface disposed in the predefined space. The connection interface is electrically connected to the CPU. The notebook computer includes a plurality of electronic device modules. Each electronic device module includes a casing portion and a main body portion, and the main body portion includes a transmission interface. The size of each electronic device module may correspond to the size of the predefined space. Each electronic device module may be secured in the predefined space for combination with the housing, and the transmission interface is electrically connected to the connection interface for power or data transmission. The plurality of electronic device modules are capable of combining individually with the housing for replacing different functions.

In order to achieve another objective of the present invention, the electronic device module of the present invention comprises a casing portion and a main body portion placed in the casing portion. The main body portion has a transmission interface. The electronic device module characterized in that the electronic device module directly attaches to the notebook computer, and the transmission interface and the notebook computer are electrically connected to provide power or data transmission.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
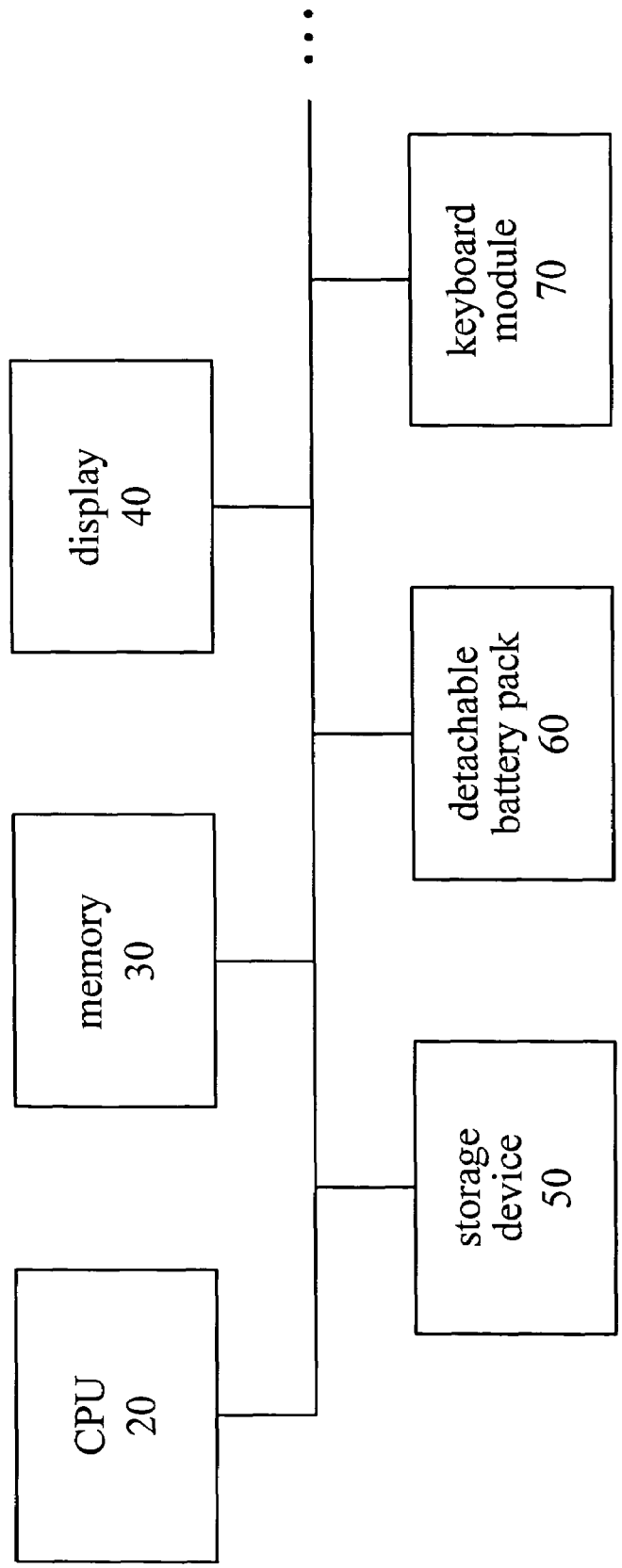
FIG. 1 is a functional block drawing of internal elements of a notebook computer according the present invention.

Please refer to FIG. 1. FIG. 1 is a functional block drawing of internal elements of a notebook computer according the present invention. The notebook computer 1 comprises a CPU 20, a memory 30, a display 40, a storage device 50, a detachable battery pack 60 and a keyboard module 70. Each element is electrically connected to the other, and the detachable battery pack 60 provides power for the notebook computer 1.

Figure 2:
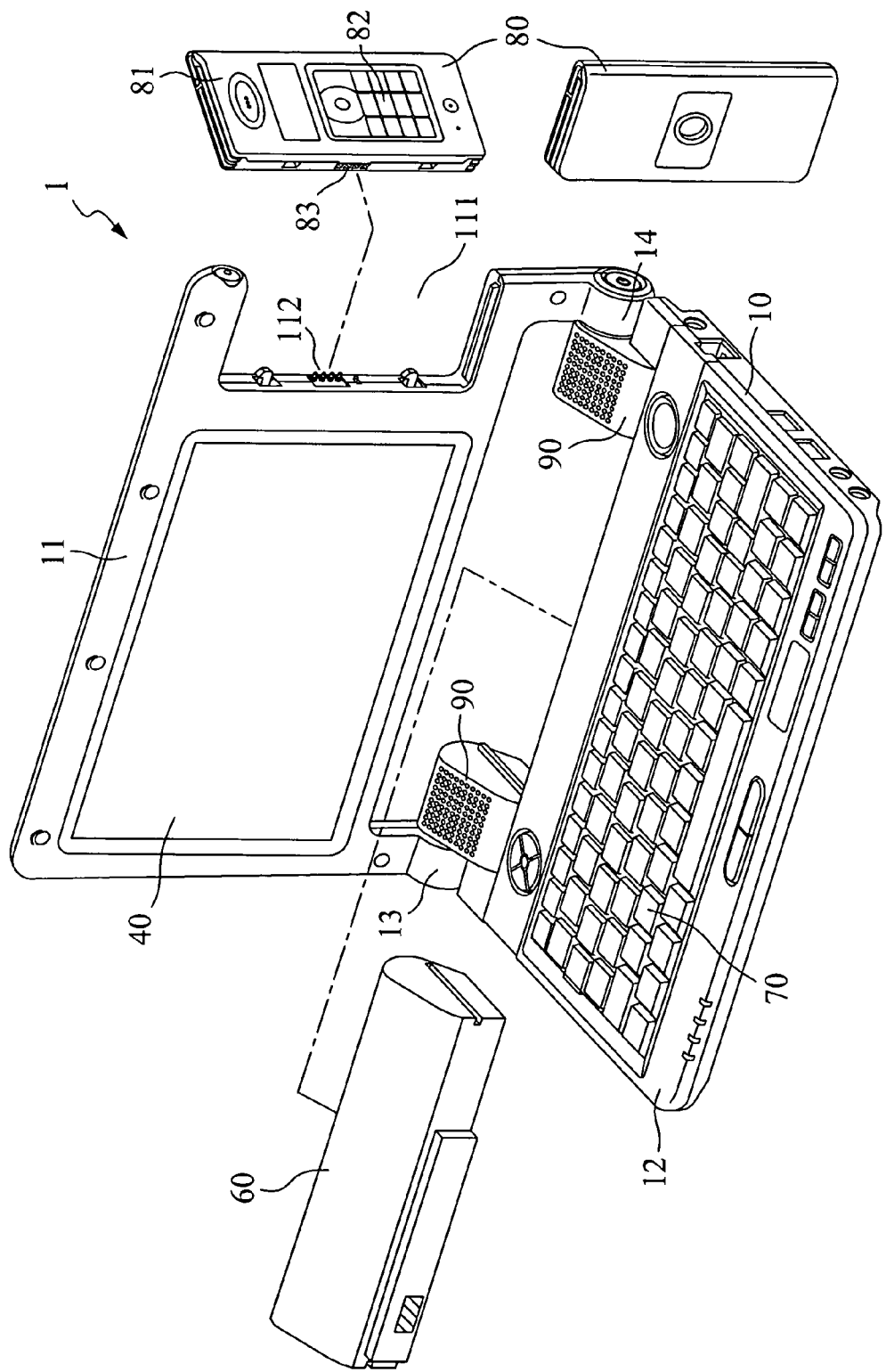
FIG. 2 is a schematic drawing prior to combining a notebook computer and an electronic device module according the present invention.
Figure 3:
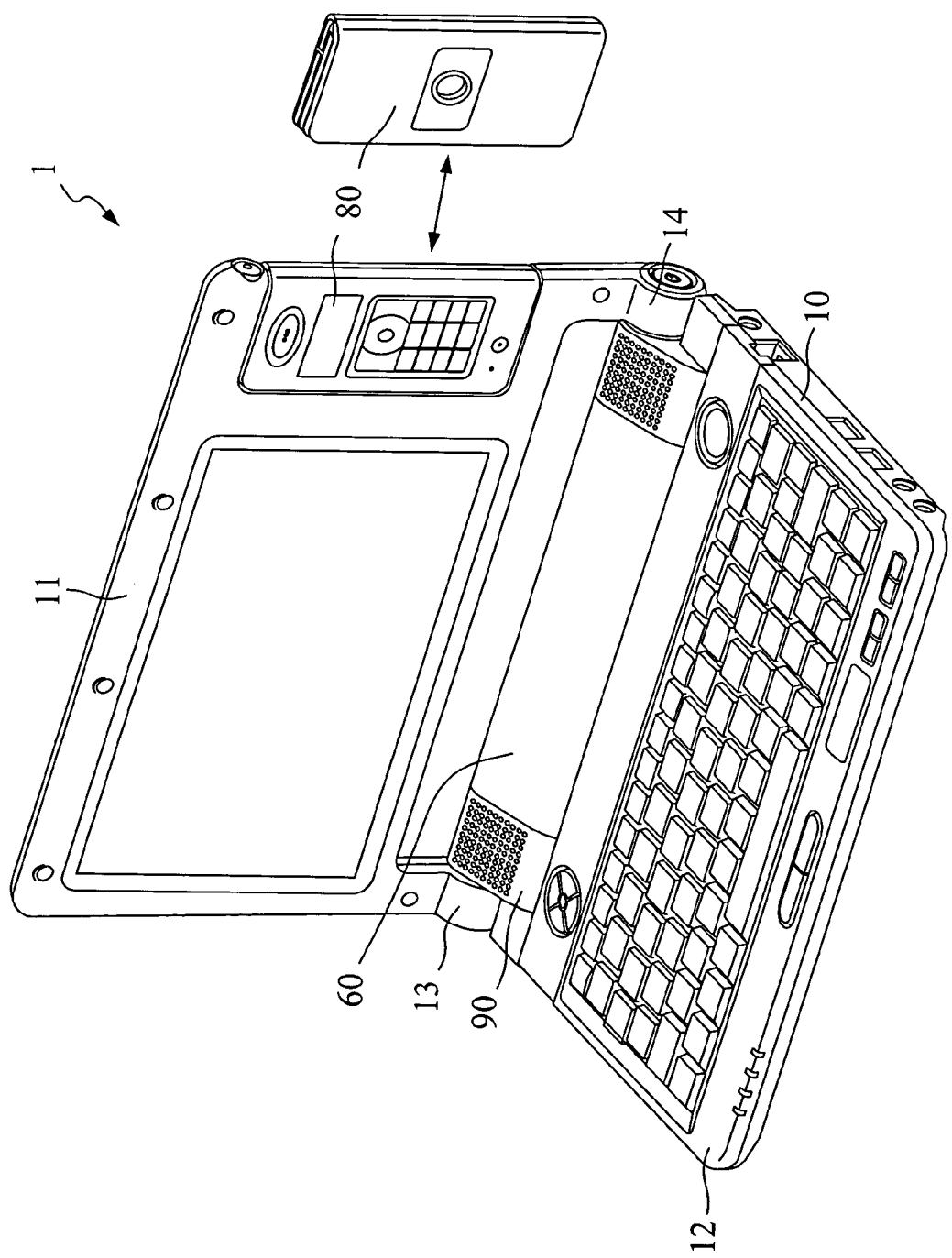
FIG. 3 is a schematic drawing after combining a notebook computer and an electronic device module according the present invention.

Please refer to FIG. 2 and FIG. 3. FIG. 2 is a schematic drawing prior to combining together the notebook computer and an electronic device module according the present invention. FIG. 3 is a schematic drawing after combining the notebook computer and an electronic device module according the present invention. The notebook computer 1 comprises a housing 10, a display 40, a detachable battery pack 60 and a keyboard module 70, and it further characterized in that the housing 10 further comprises a predefined space 111 and a connection interface 112. The connection interface 112 is disposed within the predefined space 111 and is electrically connected to the CPU 20. The notebook computer 1 further comprises a plurality of electronic device modules 80. Each electronic device module 80 comprises a casing portion 81 and a main body portion 82. The main body portion 82 comprises a transmission interface 83. The shape of each electronic device module 80 matches the predefined space 111 so that each electronic device module 80 can be placed in the predefined space 111 to combine with the housing 10, and the transmission interface 83 and the connection interface 112 are electrically connected to each other for power or data transmission. Additionally, the electronic device modules 80 are detachable.

When a user combines together the electronic device module 80 and the notebook computer 1, because of the electronic connection between the transmission interface 83 and the connection interface 112, the notebook computer 1 can be used to operate or control the electronic device module 80. When the electronic device module 80 is detached from the notebook computer 1, it can be used as an independent electronic device. In this embodiment, the electronic device module 80 may be a VOIP device, a web-cam device, or another electronic device module 80 such as a GPS device, a calendar device, or a digital TV device.

The housing 10 of the notebook computer 1 comprises an upper housing 11, a lower housing 12, a first pivot 13 and a second pivot 14. The upper housing 11 and the lower housing 12 are connected to each other via the first pivot 13 and the second pivot 14, so that the position of the upper housing 11 against the lower housing 12 can be adjusted. In this embodiment, the display 40, the predefined space 111 and the connection interface 112 are placed in the upper housing 11, and the detachable battery pack 60 and the keyboard module 70 are placed in the lower housing 12. The detachable battery pack 60 of the notebook computer 1 is placed between the first pivot 13 and the second pivot 14; by combining the detachable battery pack 60 and the pivots, not only space is saved in the notebook computer 1, but also detachment of the detachable battery pack 60 is simplified. The notebook computer 1 further comprises a speaker module 90, which is placed between the first pivot 13, the second pivot 14 and the detachable battery pack 60. With this structural design, more space is saved. In addition, in this embodiment, the notebook computer 1 further comprises various slots on two sides of the lower housing 12, such as a USB slot, a DVI slot, slots for an external power plug, an internet plug, etc.

Figure 4:
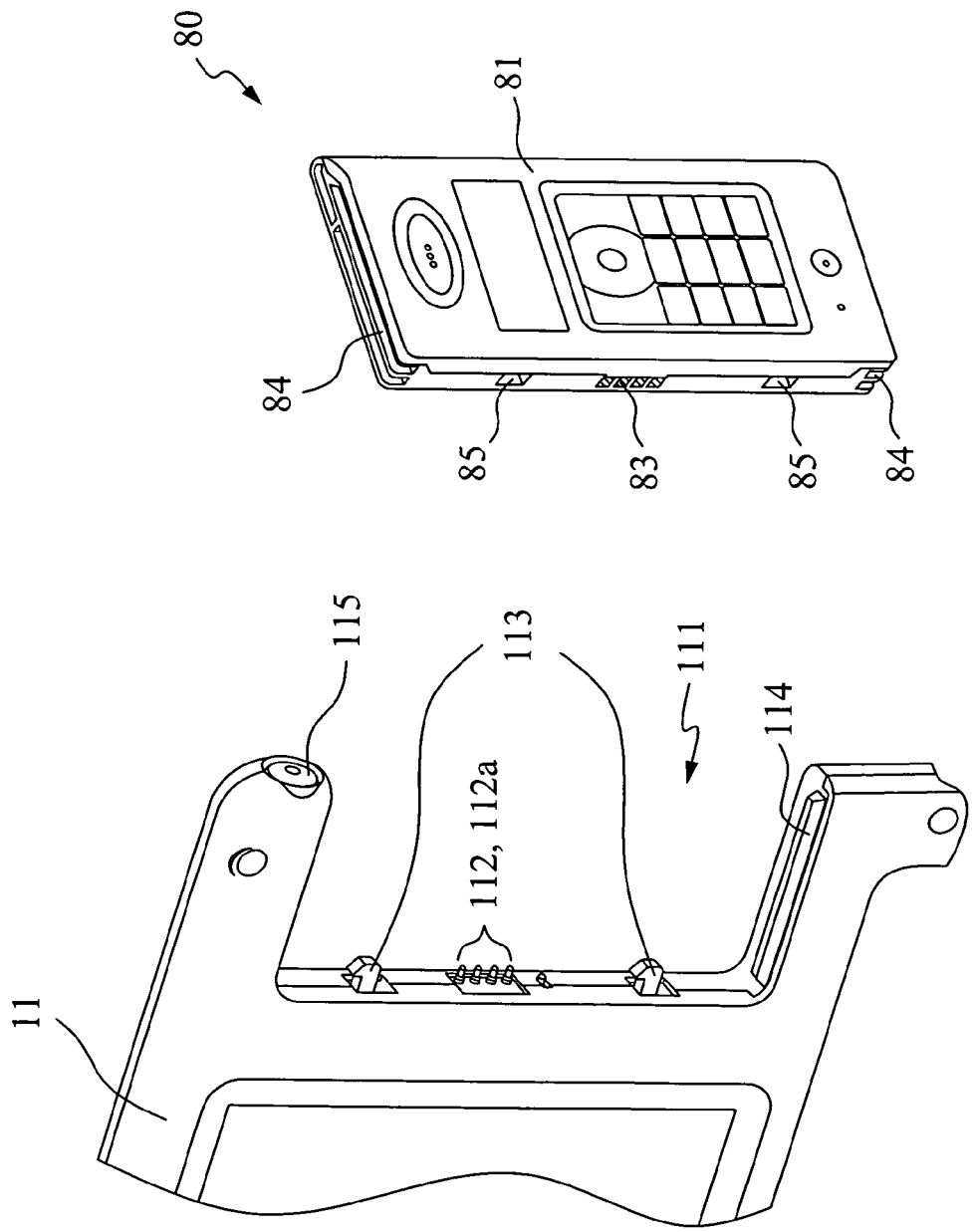
FIG. 4 is a detailed view of a predefined space in a notebook computer according the present invention.

Please refer to FIG. 4. FIG. 4 is a detailed view of the predefined space in the notebook computer according the present invention. The predefined space 111 further comprises at least one fastening member 113, and at least one engaging slot is disposed correspondingly on the electronic device module 80 to engage with the at least one fastening member 113 such that the electronic device module 80 may secure into the predefined space 111. In this embodiment, the at least one fastening member 113 is an L-shaped hook, and the casing portion 81 of the electronic device module 80 has at least one corresponding L-shaped engaging slot 85. Therefore, to prevent the electronic device module 80 detaching from the predefined space 111, the L-shaped hook attaches onto the L-shaped engaging slot 85. Two sides of the predefined space 111 each comprises a protrusion 114, which correspond to a plurality of indentations 84 on the casing portion 81 of the electronic device module 80. When the electronic device module 80 is widthwise inserted into the predefined space 111, the protrusions 114 on the predefined space 111 are inserted into the corresponding indentations 84 on the casing portion 81 so that the electronic device module 80 is more securely fastened within the predefined space 111. Moreover, in this embodiment, the connection interface 112 disposed in the predefined space 111 includes a plurality of elastic pins 112a, which can be compressed and recover due to an internal elastic element (not shown). In order to cause the electronic device module 80 to electrically connect to the predefined space 111, while the electronic device module 80 is slowly pushed into the predefined space, the plurality of pins 112a and the transmission interface 83 contact each other and electrically connect with each other. The plurality of pins 112a are compressed by a force in a direction opposite to the moving direction of the electronic device module 80 until the electronic device module 80 is completely fastened in the predefined space 111 by way of the at least one fastening member 113.

Figure 5:
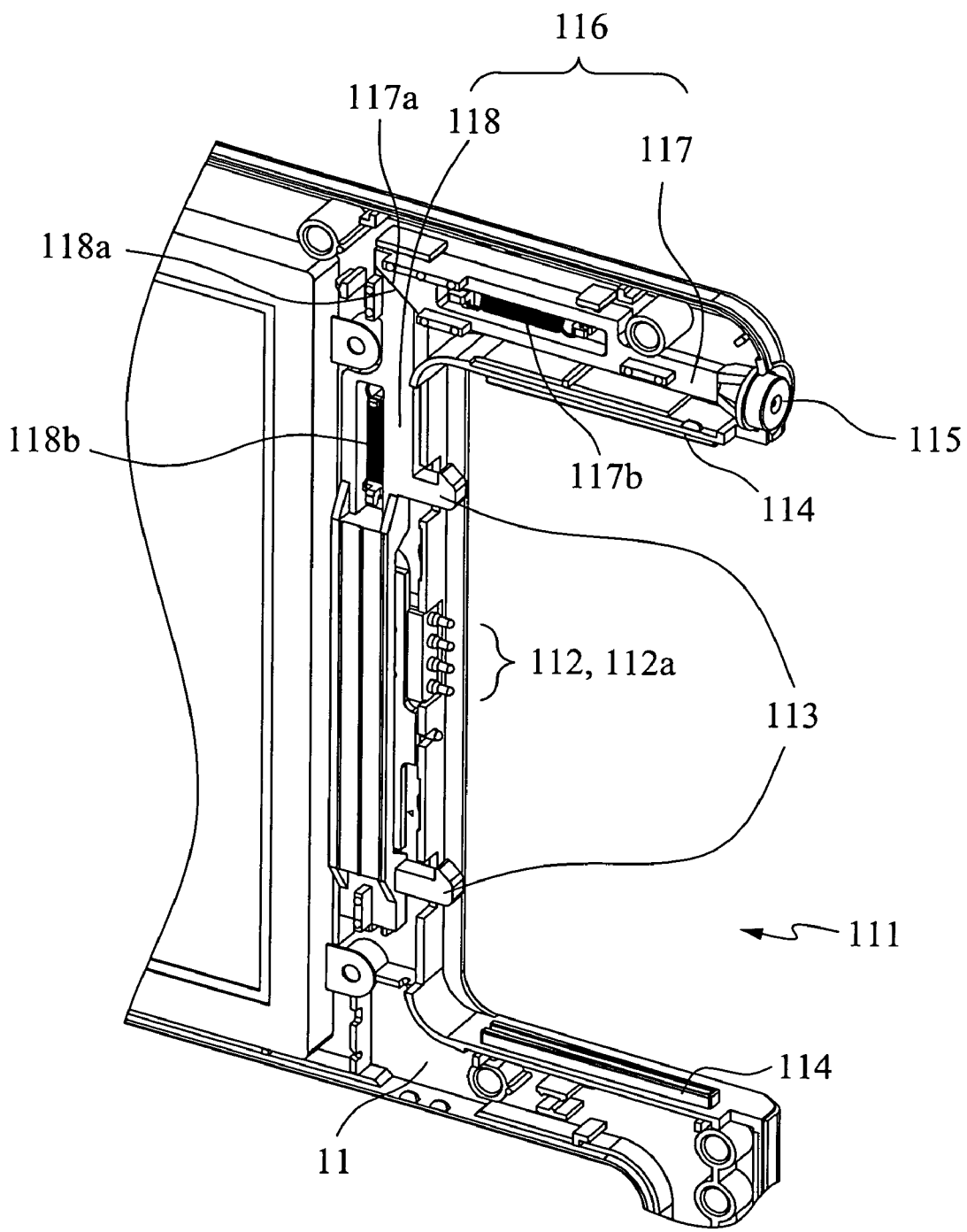
FIG. 5 is a cross-sectional drawing of an upper housing of a notebook computer according the present invention.

Please refer to FIG. 5. FIG. 5 is a cross-sectional view of an upper housing of the notebook computer according the present invention. As shown in FIG. 5, the upper housing 11 further comprises an ejecting device 115 and a linking structure 116. The linking structure 116 comprises a first moving element 117 and a second moving element 118. The first moving element 117 is connected to the ejecting device 115, and one end of the first moving element 117 forms a first oblique guiding side 117a which contacts a second oblique guiding side 118a of the second moving element 118. The ejecting device 115 and the predefined space 111 are placed next to each other, the at least one fastening member 113 is combined with the second moving element 118 of the linking structure 116. In this embodiment, the ejecting device 115 is a button. When a user wants to detach the electronic device module 80 from the notebook computer 1, he or she presses the ejecting device 115 to cause the first moving element 117 to move backward horizontally. The first oblique guiding side 117a of the first moving element 117 applies a perpendicular downward force to the second oblique guiding side 118a of the second moving element 118 to move the second moving element 118 downward, and the at least one fastening member 113 also moves downwards for release from the L-shaped engaging slot 85, thereby detaching the electronic device module 80. When the at least one fastening member 113 releases the electronic device module 80, the plurality of pins 112a generate a recover elasticity to push the electronic device module 80 out from the predefined space 111, and the user can thus remove the electronic device module 80. Furthermore, the linking structure 116 has a first spring 117b, with one end of the first spring 117b connected to the upper housing 11, and the other end connected to the first moving element 117. The linking structure 116 comprises a second spring 118b, with one end of the second spring 118b connected to the upper housing 11, and the other end connected to the second moving element 118. When the ejecting device 115 is pressed down, the first moving element 117 and the second moving element 118 begin to move and pull on the first spring 117b and the second spring 118b; after the ejecting device 115 is released, the first spring 117b and the second spring 118b generate a recover force to push the first moving element 117 and the second moving element 118 back to their original positions so the ejecting device 115 and the at least one fastening member 113 also move back to their original positions.

Figure 6:
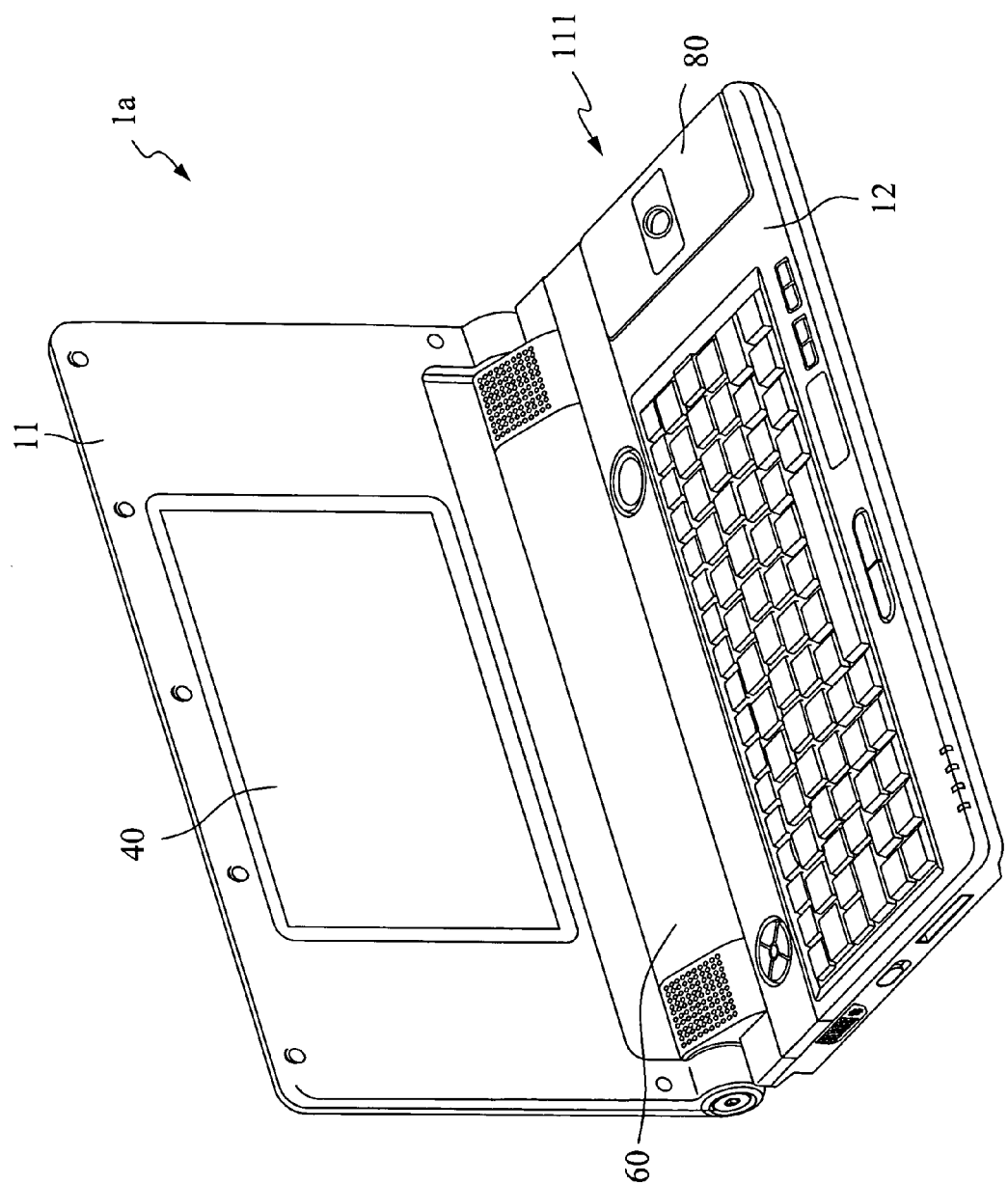
FIG. 6 is a perspective view of a second embodiment notebook computer according the present invention.

Please refer to FIG. 6. FIG. 6 is a perspective view of a second embodiment notebook computer according the present invention. In this embodiment, the predefined space 111 of the notebook computer 1a is placed in the lower housing 12, so the electronic device module 80 is also combined with the lower housing 12. Therefore, the size of the display 40 of the upper housing 11 is adjustable.

Figure 7:
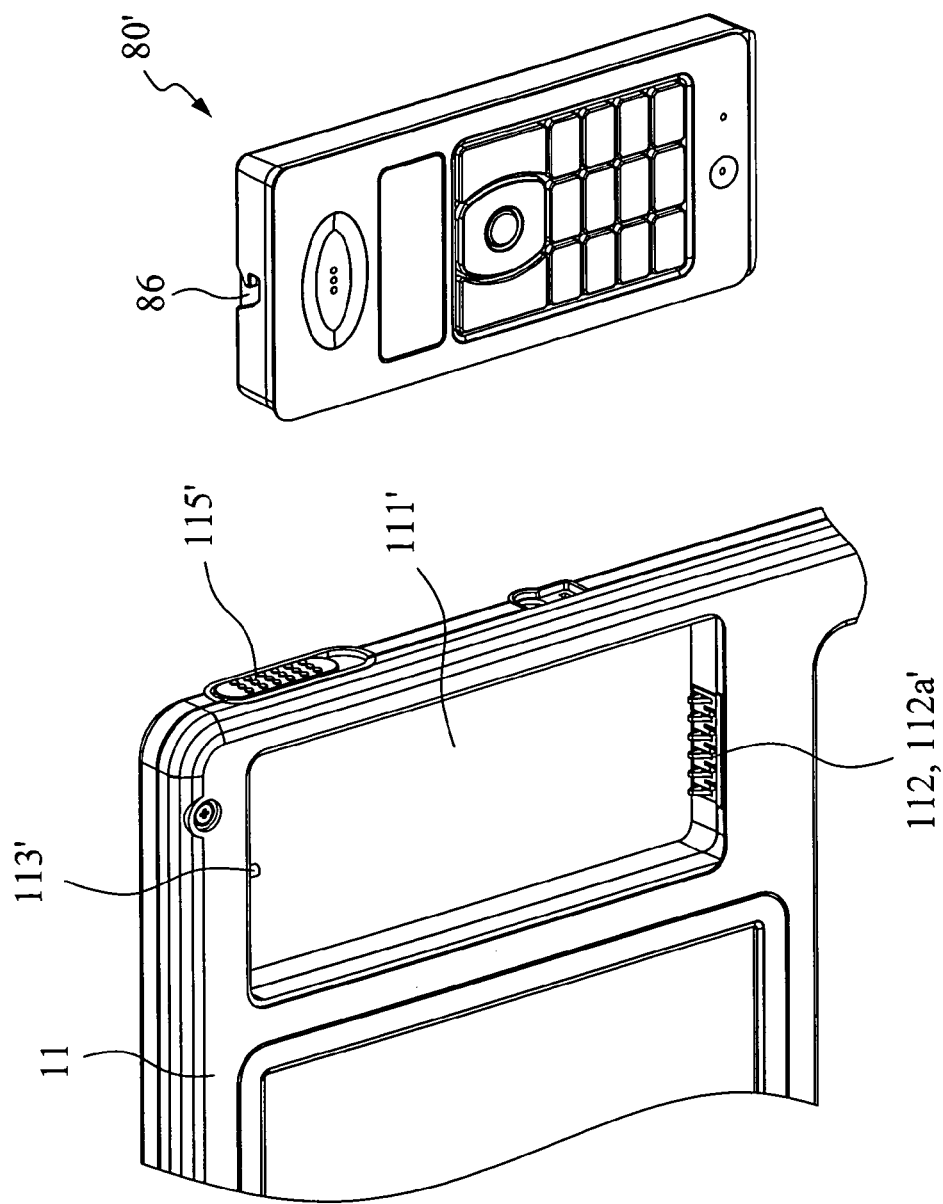
FIG. 7 is a detailed view of a predefined space of a third embodiment notebook computer according the present invention.

Please refer to FIG. 7. FIG. 7 is a detailed view of the predefined space of a third embodiment notebook computer according the present invention. The predefined space 111' further comprises a fastening member 113', which is used for fastening the electronic device module 80' into the predefined space 111'. In this embodiment, the fastening member 113' is a cylinder, and the casing portion 81' of the electronic device module 80' has a corresponding inverted hook-shaped engaging slot 86. When the electronic device module 80' is to be combined with the predefined space 111', the cylinder is inserted into the inverted hook-shaped engaging slot 86 and against the inverted hook-shaped engaging slot 86 to prevent the electronic device module 80*a* escaping from the predefined space 111'. In this embodiment, the connection interface 112 disposed in the predefined space 111' can be a plurality of elastic pins 112*a*', and the plurality of pins 112*a*' can be compressed while a force is applied or automatically recover when the force is removed. In order for the electronic device module 80' to combine with the predefined space 111', while the electronic device module 80' is slowly rotated and pushed into the predefined space 111', the plurality of pins 112*a*' and the transmission interface (not shown) contact each other and become electronically connected to each other. The plurality of pins 112*a*' are compressed by a force that is in the opposite direction of the moving direction of the electronic device module 80' until the electronic device module 80' is completely fastened in the predefined space 111' by way of the fastening member 113'.

Figure 8:
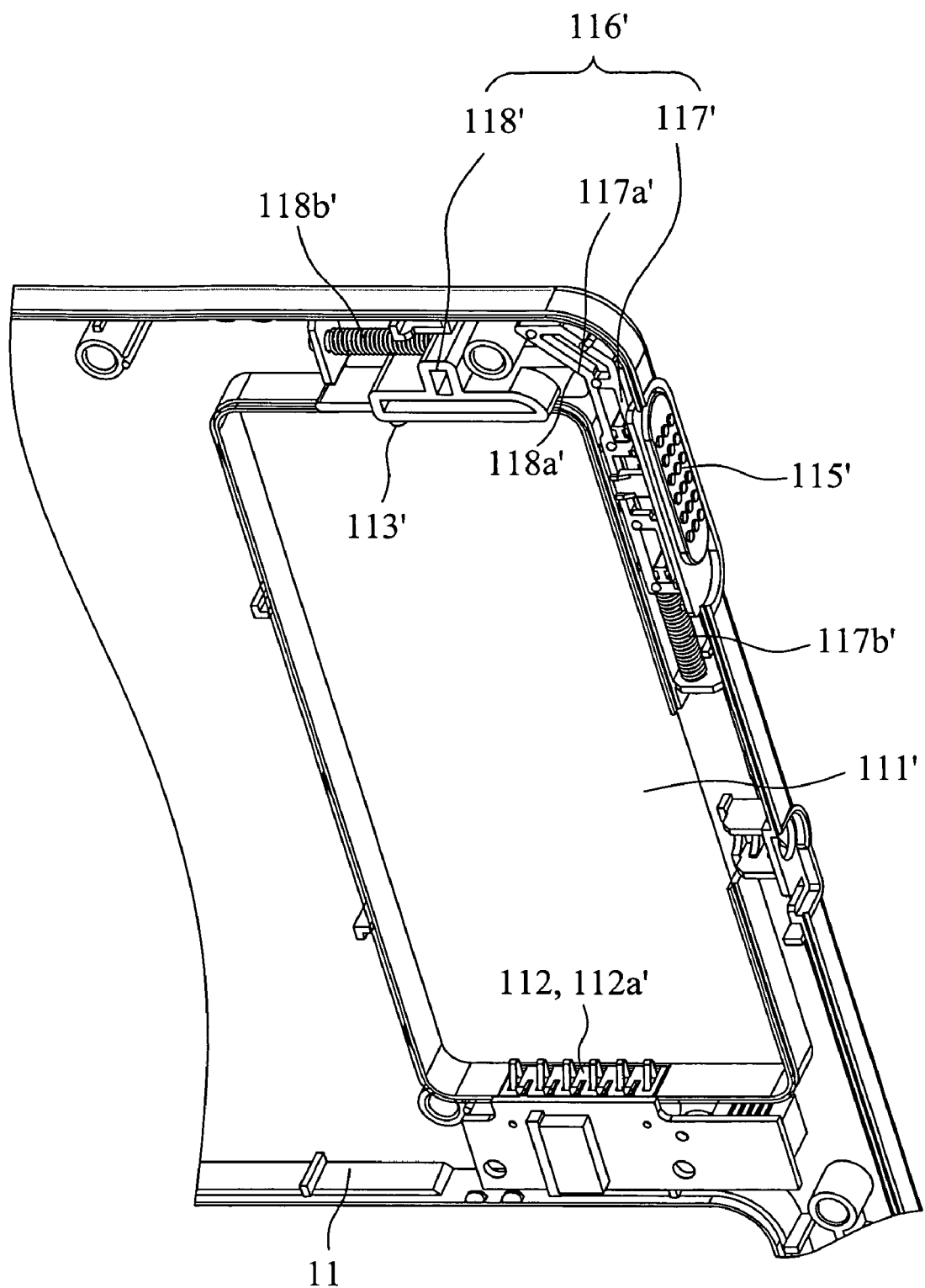
FIG. 8 is a cross-sectional view of an upper housing of a notebook computer of the third embodiment according the present invention.

Please refer to FIG. 8. FIG. 8 is a cross-sectional view of an upper housing of the notebook computer of the third embodiment according the present invention. As shown in FIG. 8, the upper housing 11 further comprises an ejecting device 115' and a linking structure 116'. The linking structure 116' comprises a first moving element 117' and a second moving element 118'. The first moving element 117' is connected to the ejecting device 115', and one end of the first moving element 117' forms a first oblique guiding side 117*a*' which contacts a second oblique guiding side 118*a*' of the second moving element 118'. The ejecting device 115' is disposed next to the predefined space 111', and the fastening member 113' is combined with the second moving element 118' of the linking structure 116'. In this embodiment, the ejecting device 115' is a push switch. When a user wants to detach the electronic device module 80' from the notebook computer 1, he or she presses the ejecting device 115' to cause the first moving element 117' to move downward. The first oblique guiding side 117*a*' of the first moving element 117' applies a horizontal leftward force to the second oblique guiding side 118*a*' of the second moving element 118' to move the second moving element 118' leftward, and the fastening member 113' also moves leftward. Due to the beveled structure of the inverted hook-shaped engaging slot 86, the fastening member 113' moves to the left to pushes out and releases the electronic device module 80'. When the fastening member 113' releases the electronic device module 80', the plurality of pins 112*a*' generate a recover elastic force to push the electronic device module 80' out from the predefined space 111', and so the user can remove the electronic device module 80'. Furthermore, the linking structure 116' has a first spring 117*b*', with one end of the first spring 117*b*' pressing against the upper housing 11, and the other end pressing against the first moving element 117'. The linking structure 116' comprises a second spring 118*b*', with one end of the second spring 118*b*' pressing against the upper housing 11, and the other end pressing against the second moving element 118'. When the ejecting device 115' is pressed down, the first moving element 117' and the second moving element 118' begin to move and compress the first spring 117*b*' and the second spring 118*b*' at the same time. After the ejecting device 115' is released, the first spring 117*b*' and the second spring 118*b*' generate recover force to pull the first moving element 117' and the second moving element 118' back to their original positions so the ejecting device 115' and the fastening member 113' also move back to their original positions.

Figure 9:
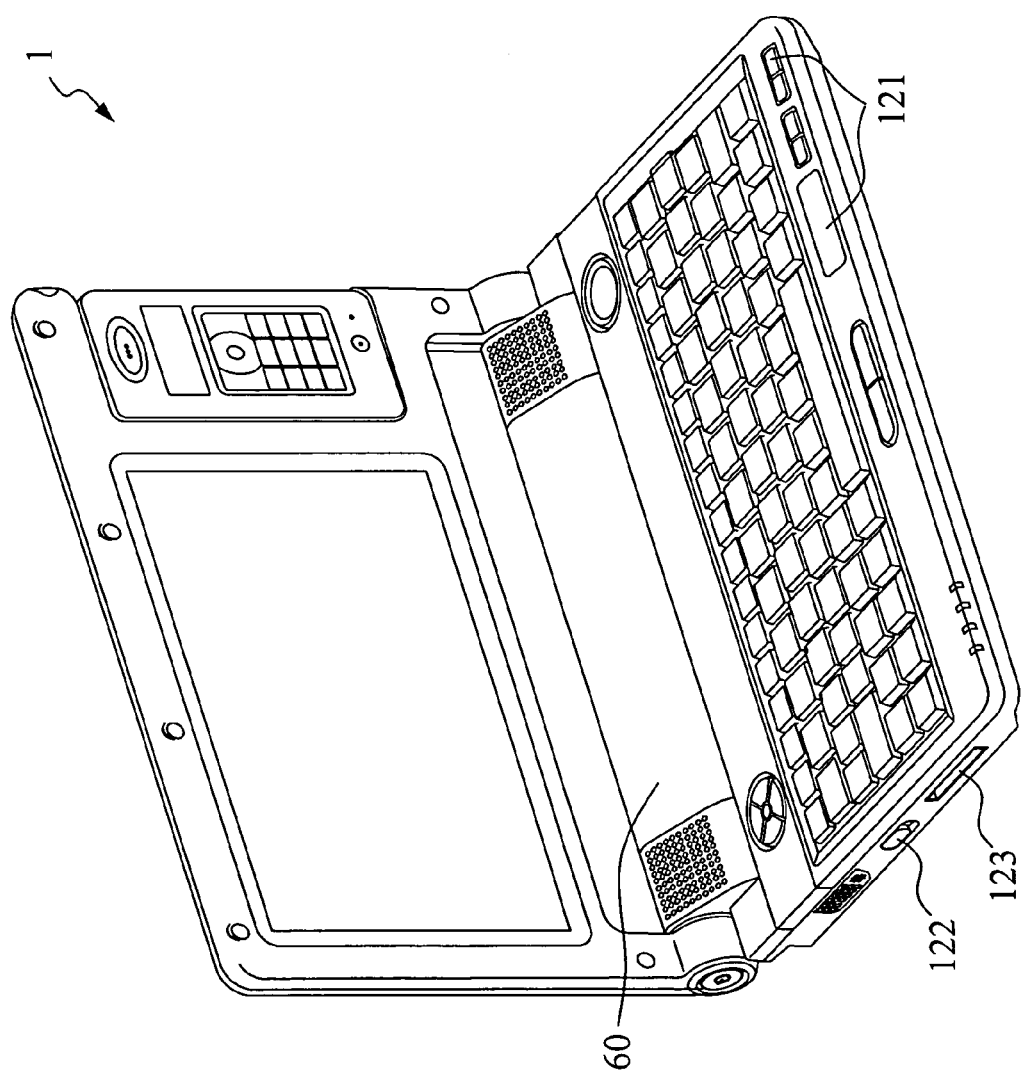
FIG. 9 is a perspective view of another side of a notebook computer according the present invention.

Please refer to FIG. 9. FIG. 9 is a perspective view of another side of the notebook computer according the present invention. The lower housing 12 of the notebook computer 1 further comprises an MP3 player module 121, a switch 122 and a memory card slot 123. The MP3 player module 121 includes control buttons and a screen. By controlling the switch 122, the detachable battery pack 60 or an external power supply can optionally provide power to the notebook computer 1 or the MP3 player module 121. When the power is delivered to the notebook computer 1, the MP3 player module 121 is turned off; and when the power is delivered to the MP3 player module 121, the MP3 player module 121 can be operated without turning on the notebook computer 1. The memory card slot 123 can accept a memory card so the MP3 player module 121 can read data from it.

Figure 10:
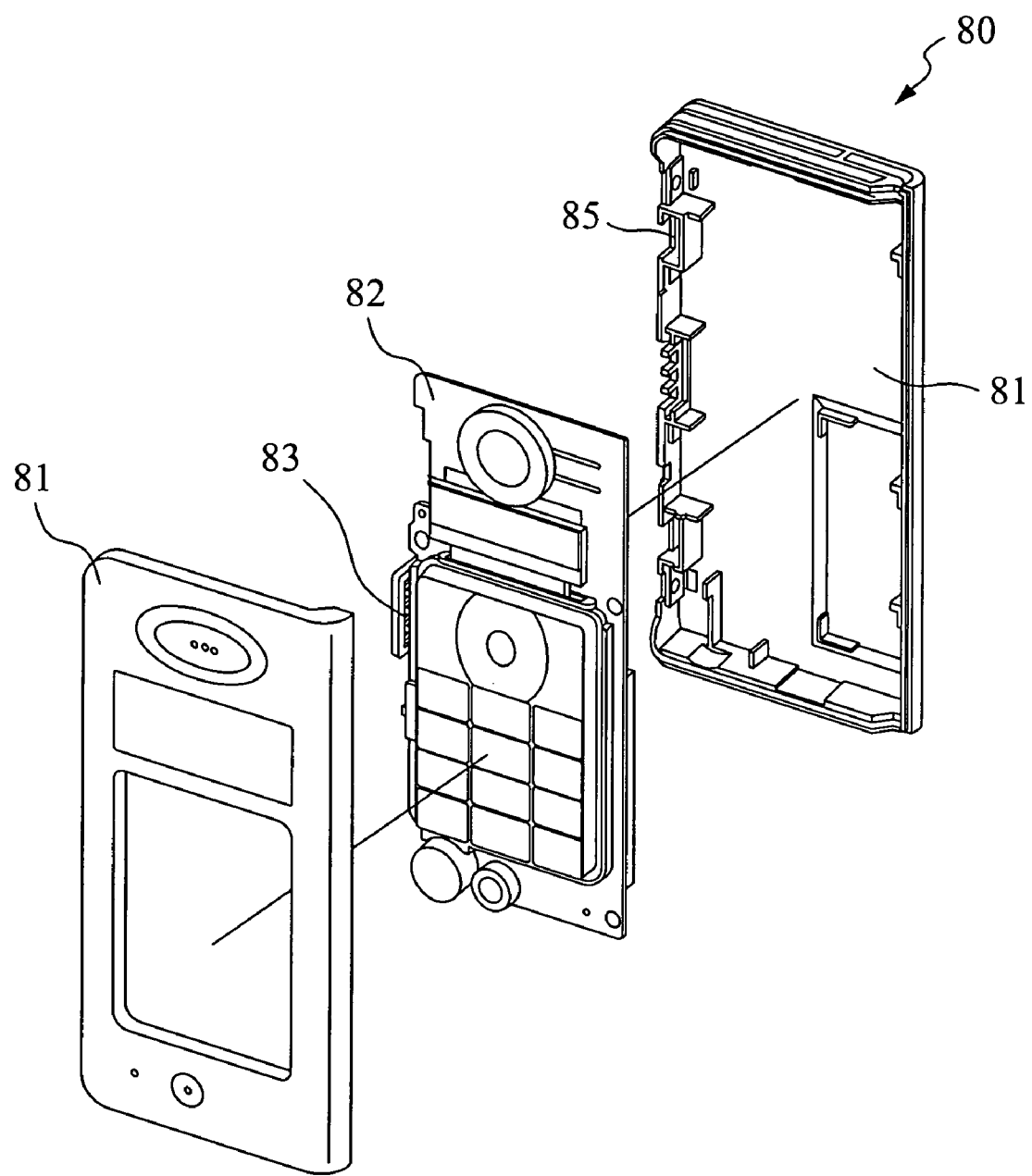
FIG. 10 is an exploded view of an electronic device module according the present invention.
Figure 11:
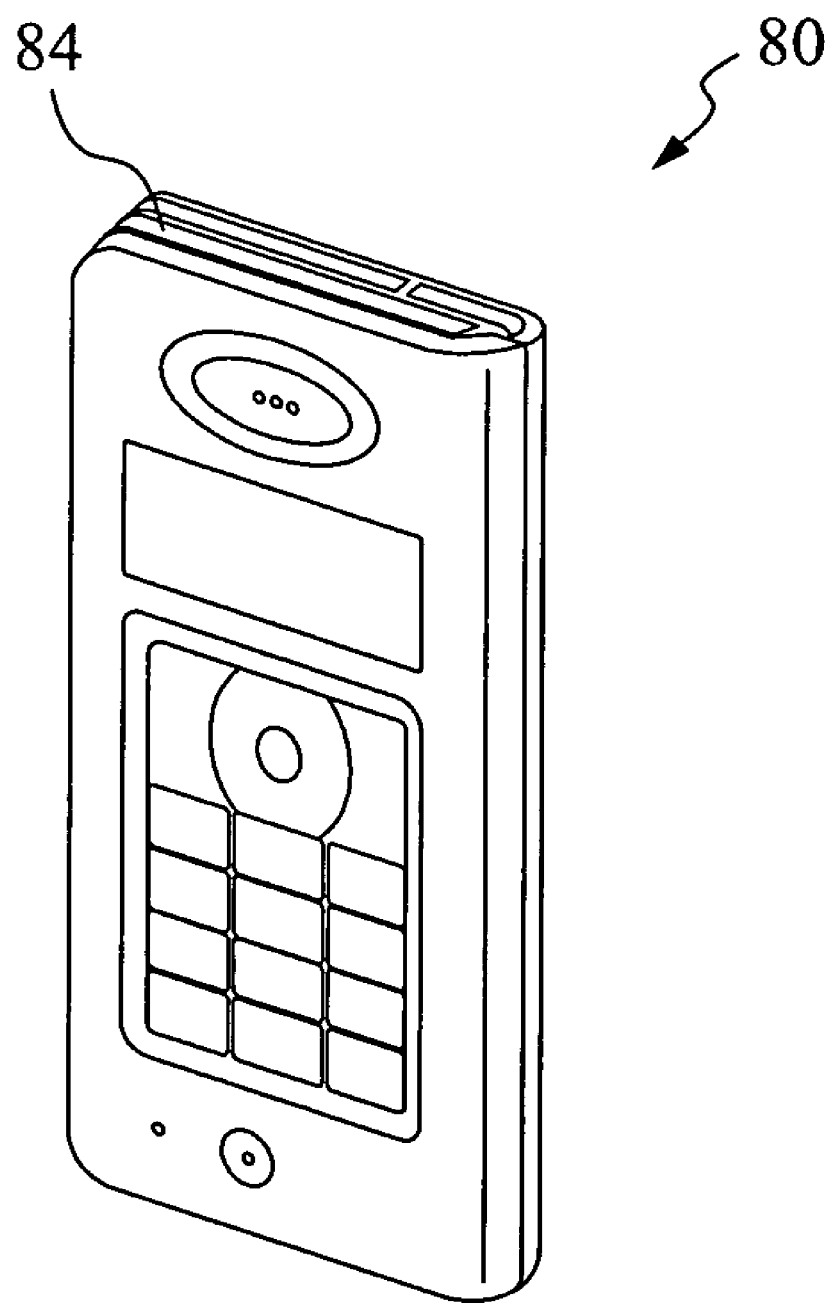
FIG. 11 is a perspective view of an electronic device module according the present invention.

Please refer to FIG. 10 and FIG. 11. FIG. 10 is an exploded view of the electronic device module according the present invention. FIG. 11 is a perspective view of the electronic device module according the present invention. The electronic device module 80 can be combined with the notebook computer 1, and comprises a casing portion 81 and a main body portion 82 disposed in the casing portion 81. The main body portion 82 comprises a transmission interface 83. The electronic device module 80 is characterized in that the electronic device module 80 is directly attached to the notebook computer, and the transmission interface 83 is electrically connected to the notebook computer 1 for power or data transmission.

The electronic device module 80 itself may be a common electronic device product, which can be operated independently or combined with the notebook computer 1. The casing portion 81 of the electronic device module 80 further comprises the plurality of indentations 84 used with fastening protrusions 114 (not shown) on both sides of the predefined space 111 of the notebook computer 1. Therefore, when the electronic device module 80 is widthwise inserted into the predefined space 111, the protrusions 114 in the predefined space 111 insert into corresponding indentations 84 on the casing portion 81 so that the electronic device module 80 is more securely fastened within the predefined space 111. The casing portion 81 further comprises the at least one L-shaped engaging slot 85, which corresponds to the at least one fastening member 113 (not shown) of the predefined space 111. Therefore, to prevent the electronic device module 80 detaching from the predefined space 111, the at least one fastening member 113 inserts into the L-shaped engaging slot 85. The L-shaped engaging slot 85 can also be designed as the inverted hook-shaped engaging slot 86 to fasten with the corresponding fastening member 113.

Although the present invention has been explained in relation to its preferred embodiment, it is to be understood that many other possible modifications and variations can be made without departing from the spirit and scope of the invention as hereinafter claimed.

What is claimed is:

1. A notebook computer comprising: a housing, a CPU, a memory, a display, a storage device, a detachable battery pack and a keyboard module, characterized in that:

the housing comprises a predefined space and a connection interface disposed in the predefined space, the connection interface electrically connected to the CPU; and the notebook computer includes a plurality of electronic device modules, each electronic device module having a casing portion and a main body portion, the main body portion including a transmission interface, the size of each electronic device module corresponding to the size of the predefined space, each electronic device module secured within the predefined space for combination with the housing, and the transmission interface is electrically connected to the connection interface for power or data;

wherein the plurality of electronic device modules are capable of combining individually with the housing for replacing different functions.

2. The notebook computer as claimed in claim 1, wherein the housing further comprises an upper housing, a lower housing, a first pivot and a second pivot, and the upper housing and the lower housing are connected to each other via the first pivot and the second pivot.

3. The notebook computer as claimed in claim 2, wherein the predefined space and the connection interface are disposed in the upper housing.

4. The notebook computer as claimed in claim 2, wherein the predefined space and the connection interface are disposed in the lower housing.

5. The notebook computer as claimed in claim 2, wherein the notebook computer further comprises a speaker module, the speaker module placed between the first pivot, the second pivot and the detachable battery pack.

6. The notebook computer as claimed in claim 1, wherein two sides of the predefined space each comprises a protrusion, a plurality of indentations are disposed correspondingly on the casing portion of the electronic device module to engage with the protrusions.

7. The notebook computer as claimed in claim 1, wherein the predefined space further comprises at least one fastening member, at least one engaging slot is disposed correspondingly on the electronic device module to engage with the at least one fastening member such that the electronic device module may secure into the predefined space.

8. The notebook computer as claimed in claim 7, wherein the at least one fastening member is an L-shaped hook corresponding to at least one L-shaped engaging slot on the electronic device module.

9. The notebook computer as claimed in claim 7, wherein the at least one fastening member is a cylinder corresponding to at least one inverted hook-shaped engaging slot on the electronic device module.

10. The notebook computer as claimed in claim 7, wherein the upper housing further comprises an ejecting device and a linking structure, the linking structure having a first moving element and a second moving element, the first moving element connected to the ejecting device, and one end of the first moving element forming a first oblique guiding side which contacts a second oblique guiding side of the second moving element.

11. The notebook computer as claimed in claim 10, wherein the at least one fastening member is attached onto the second moving element of the linking structure.

12. The notebook computer as claimed in claim 10, wherein the linking structure comprises a first spring, one end of the first spring connected to the upper housing, and the other end connected to the first moving element; wherein the linking structure comprises a second spring, one end of the second spring is connected to the upper housing, and the other end is connected to the second moving element.

13. The notebook computer as claimed in claim 10, wherein the linking structure comprises a first spring, one end of the first spring pressing against the upper housing, and the other end pressing against the first moving element; wherein the linking structure comprises a second spring, one end of the second spring pressing against the upper housing, and the other end pressing against the second moving element.

14. The notebook computer as claimed in claim 1, wherein the connection interface includes a plurality of elastic pins which can eject the electronic device module from the predefined space.

15. The notebook computer as claimed in claim 1, wherein the housing further comprises an MP3 player module including control buttons and a screen.

16. The notebook computer as claimed in claim 15, wherein the housing further comprises a switch for switching power between the notebook computer and the MP3 player module.

17. The notebook computer as claimed in claim 15, wherein the housing further comprises a memory card slot for accepting a memory card to be read by the MP3 player module.

18. The notebook computer as claimed in claim 15, wherein the control buttons and the screen are disposed in the lower housing.

19. The notebook computer as claimed in claim 1, wherein the main body portion of each the electronic device module is selected from a group consisting of VOIP devices, GPS devices, calendar devices, web-cam devices and digital TV devices or a combination thereof.

20. The notebook computer as claimed in claim 1, wherein the electronic device module detaching from the notebook computer can be used independently.

\* \* \* \* \*